April 13, 1926.  1,580,768
V. H. TODD
ELECTRICAL MEASURING INSTRUMENT
Filed Feb. 26, 1921
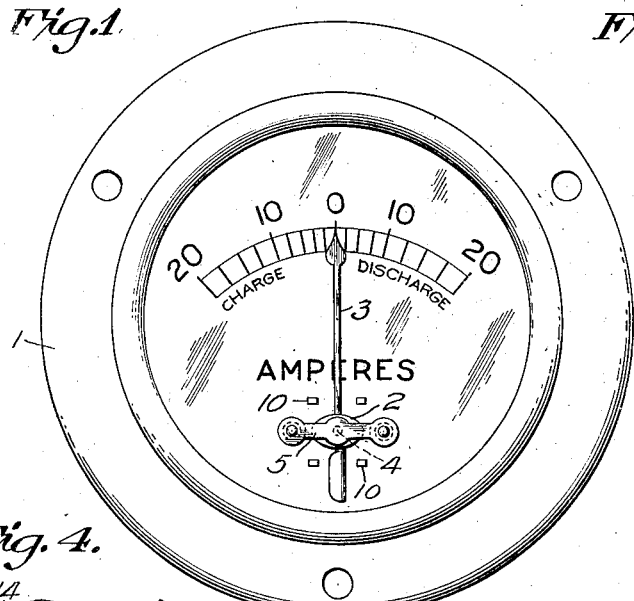
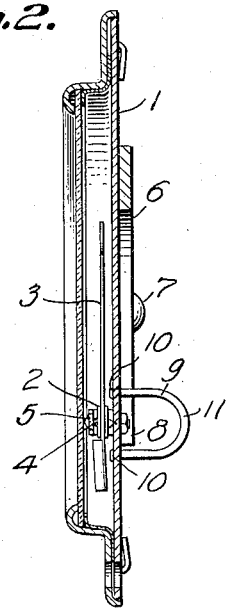
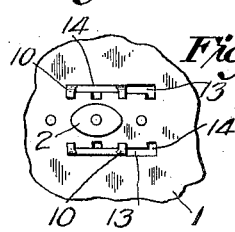
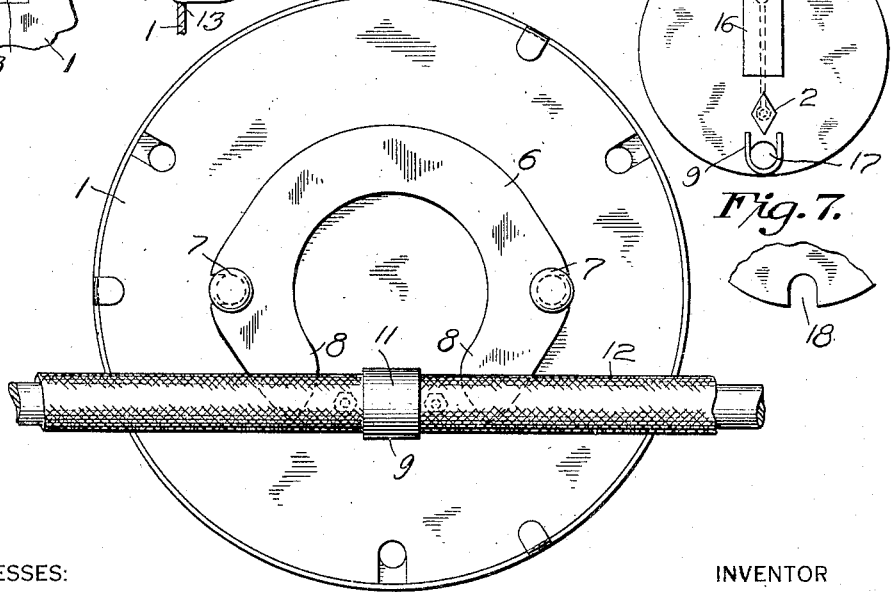
WITNESSES:
R. S. Harrison
F. H. Miller
INVENTOR
Victor H. Todd,
BY
Wesley G. Carr
ATTORNEY Patented Apr. 13, 1926.

1,580,768

UNITED STATES PATENT OFFICE.

VICTOR H. TODD, OF NEWARK, NEW JERSEY, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed February 26, 1921. Serial No. 448,100.

*To all whom it may concern:*

Be it known that I, VICTOR H. TODD, a citizen of the United States, and a resident of Newark, in the county of Essex and State of New Jersey, have invented a new and useful Improvement in Electrical Measuring Instruments, of which the following is a specification.

My invention relates to electrical measuring instruments and particularly to ammeters for use in connection with storage batteries, automobiles and similar service.

One object of my invention is to provide an instrument, of the above indicated character, that shall embody neither coils nor leads and that shall be so adapted for inductive co-operation with substantially any part of a circuit to be measured as to render the mounting of the instrument in operative connection to the circuit an extremely simple operation.

Another object of my invention is to provide a pocket-type ammeter that shall not require the familiar and well-known casing, thereby being desirably reduced in size and weight, and that shall be otherwise so constructed that, when completely assembled, it shall appear to consist of substantially no more than the face plate or dial, the pointer and the glass cover member of a measuring instrument of a usual type.

Another object of my invention is to provide a relatively small measuring instrument that shall be simple and durable in construction, economical to manufacture and effective in operation.

Instruments of the pocket type are adapted for use on automobile dashboards or cowls, in connection with generators, motors and storage batteries for starting, ignition and lighting and, also, on motor boats, yachts, aerial craft, small direct-current switchboards and for charging batteries.

In these and in nearly all other instruments of the ammeter or voltmeter type, it has been usual to provide a casing, of appreciable size and of relatively expensive construction, to protect the operating mechanism. Further, it has been usual to provide an electro-magnet comprising a coil and a core member, disposed in the casing, and terminal studs or other members, projecting from the casing, for attachment to circuit conductors.

To the best of my knowledge, the above features have been employed in nearly all instruments of this type, being apparently considered absolutely essential, and have been utilized even where an instrument embodying an irreducible minimum of material has been sought.

In practicing my invention, I provide a single flat disk on which a pointer, a vane, a window and a relatively flat, polarizing, permanent magnet are mounted, and all of which are so constructed and related as to constitute a very thin substantially discoidal structure. A magnetizable member of substantially C or U shape is secured, at its free ends, to the disk at a position adjacent to the vane and has a loop portion projecting normal to the rear of the disk. The loop portion is adapted to receive an insulated conductor of a circuit by the simple operation of threading the conductor through the loop. The magnetizable loop member, in co-operation with the circuit conductor, constitutes the electro-magnet of the instrument for deflecting the pointer.

Figure 1 of the accompanying drawings is a front view of an electrical measuring instrument embodying my invention, Fig. 2 is a sectional view taken at right angles to Fig. 1, Fig. 3 is a rear view of the instrument shown in Figs. 1 and 2, Figs. 4 and 5 are detail views, taken at right angles to each other, of a modified form of a portion of an instrument embodying my invention, and Figs. 6 and 7 are semi-diagrammatic views of further modifications thereof.

As shown in Figs. 1, 2 and 3, a relatively thin flat disk 1, preferably of brass or of some other non-magnetizable material, constitutes the main base or supporting structure of the instrument and serves as the instrument dial.

A magnetizable armature or vane 2, preferably constructed of two relatively thin members secured together and between which a pointer 3 is clamped, is provided with a pivot shaft 4 that is delicately balanced in position at the lower central portion of the disk 1, between the latter and bearing structure 5 of usual construction.

A permanent magnet 6, preferably of magnet steel, that may be cut, punched or cast, and that is preferably of relatively thin sheet form, is secured in flat surface-tosurface engagement with the rear surface of the disk 1, as by rivets or screws 7, and has pole portions 8 disposed to polarize or balance the vane 2 to, thereby, normally maintain the pointer 3 in neutral position.

A relatively small magnetizable member 9, preferably of relatively thin sheet or strap iron, is bent on its flat sides to form a loop of substantially U shape, and is secured in openings in the disk 1, as by bending or swaging side projections or lugs 10 at the free ends thereof. The member 9, disposed normal to the disk 1 at the rear side thereof, has a closed loop portion 11 that projects a sufficient distance from the disk 1 to receive an insulated external circuit conductor 12, as shown in Fig. 3. Since the conductor 12 may be uninterrupted, so far as its relation to the portion 11 is concerned, the instrument may be mounted at any position thereon.

In operation, the permanent magnet 6 so affects the vane 2 as to normally cause the latter to be balanced, in the position shown, to maintain the pointer 3 in its zero position, which may be at the center of the scale, as shown, or at any other position on the scale according to the angular relation of the pointer and the vane. In this position, the vane is polarized in accordance with the direction of the flux in the magnet 6. When current passes through the conductor 12, a magnetic flux is set up in the member 9. This flux interacts with the flux passing through polarized vane 2 and, since the ends or poles of the member 9 are disposed intermediate the ends of the vane, in the normal position of the latter, will cause the vane to move about its pivot. The polarity of the member 9 and, consequently, the direction of deflection of the pointer 3 are determined by the direction of current flow in the conductor 12, and the amount of deflection is determined by the strength of the current.

As shown in Figs. 4 and 5, the member 9 may be removably mounted on the disk 1 by forming the lugs 10 slightly longer and bending them inwardly at substantially right angles to the disk. The latter is provided with slots 13 that conform to the ends of the member 9 and extend laterally with respect to the operative or final position of the latter. By advancing the member 9 from the rear of the disk, with the lugs 10 in register with offset openings 14 in the slots 13, the lugs 10 may be positioned at the front of the disk, from which position the member 9 may be moved laterally to its operative position. In this position, the lugs 10, by their co-operative hooking relation with the disk 1, at the edges of the slot 13, and in conjunction with depressed lugs or portions 15 on the member 9, at the rear of the disk, securely hold the member 9 in position. This construction permits the instrument to be placed in operative relation to the conductor 12 by passing the latter longitudinally through the loop, or by removing the member 9 and passing it transversely over the conductor.

The elimination of the usual coil, the meter casing and the terminal studs or members renders the device of relatively few parts and of economical construction. The danger of grounding at the terminals, which is present in instruments of usual construction, is eliminated, and an extremely compact device of very convenient manipulation provided.

As shown in Fig. 6, the permanent magnet 6 may be replaced by a bar magnet 16 of similar flat plate construction and mounted on the disk 1 or in an aperture in the latter to lie flush therewith. In this form, the vane 2, shown as diamond shaped, will be attracted more forcibly at one end and assume the position shown. Also, the member 9 may be disposed with its narrow edges against the disk and have its ends projecting upwardly to influence the vane. In this construction, an aperture 17, in the disk 1, may be provided to receive the conductor 12 or the looped portion of the member 9 may extend downwardly a sufficient distance to receive the conductor 12 without the necessity for the opening 17. Further, the member 9 may, under certain conditions, be omitted entirely and the conductor 12 positioned adjacent to the vane to affect the latter solely by the flux surrounding the conductor or an open-ended aperture 18 may, as shown in Fig. 7, be provided to position a portion of the conductor.

While I have shown and described preferred forms of my invention, changes may be effected therein without departing from the spirit and scope thereof, as set forth in the appended claims.

I claim as my invention:

1. An instrument comprising a casing, an operating mechanism including a magnetizable member therein and a magnetizable member of substantially loop shape secured at its free ends to the casing in proximate relation to said first magnetizable member and having its looped portion projecting from the casing.

2. An instrument comprising a casing, an operating mechanism including a magnetizable member therein and a magnetizable member of substantially loop shape supported by the casing adjacent to its free ends in proximate relation to said first magnetizable member and having its looped portion projecting from the casing.

3. An electrical measuring instrument comprising a casing, a movable magnetizable member therein and a magnetizable member disposed to influence said movable member and extending from a position adjacent to the latter to a position exterior to the casing for inductive co-operation with a circuit to be measured.

4. An electrical measuring instrument comprising a casing, a movable magnetizable member therein and a magnetizable member having pole portions disposed adjacent to the movable member in the casing for influencing the movable member and a looped portion projecting from the casing for the reception of an uninterrupted portion of a conductor of a circuit to be measured.

5. An instrument comprising a casing, an operating mechanism including a magnetizable member therein and a magnetizable member of substantially loop shape disposed with its free ends in proximate relation to said first magnetizable member and its loop portion projecting from the casing.

6. An electrical measuring instrument comprising a dial, a permanent magnet of substantially flat-plate formation, said elements being disposed in proximate parallel planes, a magnetizable vane adjacent to a pole of said magnet and movable in proximate parallel plane relation thereto, and a magnetizable member of substantially U-shape having its free ends adjacent to the vane and its closed end for disposition around a conductor of a circuit to be measured.

7. An electrical measuring instrument comprising a casing, a movable member therein, a magnetizable member supported by the casing, all of said parts being disposed in parallel planes, and a second magnetizable member projecting rearwardly from said casing.

8. An electrical measuring instrument comprising a movable magnetizable member, a member for controlling the movement thereof, a casing for said members and a magnetizable member for effecting movement of the movable member and having a portion exterior to the casing constructed for inductive co-operative relation to a conductor of a circuit of which a measurement is desired.

9. An electrical measuring instrument comprising a casing, a movable member therein, a magnetizable member supported by the casing, all of said parts being disposed in parallel planes, and a second magnetizable member having a portion exterior to said casing and normal to said planes.

10. An electrical measuring instrument comprising a movable element, a casing enclosing said element and a member for effecting movement of the movable element and having a portion exterior to the casing constructed for positioning an electrical element with respect to the movable element whereby said movable element is operated.

11. An electrical measuring instrument comprising a movable member, a casing therefor and a magnetizable member of substantially loop shape having its free ends disposed adjacent to said movable member and its loop portion projecting from the rear wall of the casing for the reception of a conductor to extend through the loop parallel to said rear wall.

12. The combination with an instrument mechanism and a casing therefor, of a single member of non-magnetizable sheet material constituting the sole support for said mechanism and a wall of the casing, a permanent magnet of relatively thin sheet formation supported by said supporting member and a second magnetizable member of loop-shape projecting rearwardly from said casing.

13. An electrical measuring instrument comprising a casing, a relatively thin supporting structure of substantially flat-plate formation constituting a portion of the casing, a magnetizable movable vane of substantially flat-plate formation supported in proximate parallel-plane relation thereto at one side thereof and a magnetizable vane-affecting member of substantially flat-plate formation mounted in flat-surface engagement on the other side of said supporting structure.

14. An electrical measuring instrument comprising a supporting plate, a magnetizable vane pivotally supported at one side thereof, a polarizing magnet for the vane disposed on the opposite side of the plate and a magnetizable member of substantially U shape having its ends secured to the plate adjacent to the vane and its looped portion projecting normal to the rear of the plate for the extension therethrough of a circuit conductor.

15. An electrical measuring instrument comprising a relatively thin non-magnetic supporting plate constituting a dial, a bridge member secured to the front side thereof, a magnetizable vane pivoted between the plate and the bridge, a pointer carried by the vane, a relatively thin permanent magnet of substantially C shape secured in parallel-plane relation to the rear surface of the plate and having its ends disposed adjacent to the vane, a second magnetizable member of substantially C shape having its ends secured to the plate adjacent to the vane and its looped portion projecting normal to the rear of the plate for the extension therethrough of a circuit conductor, a window for the dial, and a frame for supporting the window secured to the plate.

16. An electrical measuring instrument comprising a movable element, a casing enclosing said element and a member for effecting movement thereof and having a portion accessible from the exterior of the casing for positioning an electrical element with respect to the movable element whereby said movable element is operated.

17. An electrical measuring instrument comprising a movable element, a casing enclosing said element, and a member for effecting movement of the movable element, said casing and member being co-operatively constructed and related to provide an opening for the reception of an exterior conductor into inductive relation to said member.

18. In an electrical measuring instrument, a housing, a pointer, means for normally maintaining said pointer in neutral position within said housing, and means for deflecting said pointer from neutral position including a bar of magnetizable material having a loop therein external to said housing through which an electrical conductor may extend.

19. In an electrical measuring instrument, a housing, a pointer and a vane joined to said pointer in said housing, and magnetic means supported by said housing and acting on said vane for normally maintaining said pointer in neutral position, and means for magnetically acting on said vane to deflect said pointer from neutral position, said deflecting means comprising a bar of magnetizable material having its opposite ends positioned adjacent to said vane on opposite sides thereof and having a loop therein intermediate said ends and external to said housing through which an electrical conductor may extend.

20. In an electrical measuring instrument, the combination with a casing, a permanent horse-shoe magnet supported by the casing and a flux-responsive movable vane disposed in the casing adjacent to the poles of said magnet, of means for providing a variable quantity-responsive actuating flux for the vane comprising a structure providing substantially the most direct path between an operative flux-transmitting position adjacent to the vane and a position outside the casing for co-operation with an external element capable of rendering said structure effective to provide flux for the vane.

In testimony whereof, I have hereunto subscribed my name this 11th day of Feby. 1921.

VICTOR H. TODD.